United States Patent [19]

Yoshinaga

[11] 4,042,556

[45] Aug. 16, 1977

[54] PROCESS FOR THE PRODUCTION OF HARD VINYL CHLORIDE FOAMS

[75] Inventor: Mituji Yoshinaga, Tokyo, Japan

[73] Assignee: Central Glass Co., Ltd., Japan

[21] Appl. No.: 572,704

[22] Filed: Apr. 29, 1975

[30] Foreign Application Priority Data

May 23, 1974 Japan .................................. 49-57317
May 31, 1974 Japan .................................. 49-60767

[51] Int. Cl.$^2$ ............................................... C08J 9/10
[52] U.S. Cl. .............................. 260/2.5 P; 260/2.5 R;
260/2.5 E; 260/890; 260/891
[58] Field of Search ...................... 260/2.5 P; 264/54

[56] References Cited

U.S. PATENT DOCUMENTS 3,600,335   8/1971   Fukushima et al. ............... 260/2.5 P
3,695,477   10/1972   Edmonston et al. ............... 260/2.5 P

FOREIGN PATENT DOCUMENTS 853,321   11/1960   United Kingdom ............... 260/2.5 P

OTHER PUBLICATIONS

"Foaming Agents for Polyolefins" by Sosman SPE Journal, Sept. 1962, pp. 1184–1193.

*Primary Examiner*—Morton Foelak
*Attorney, Agent, or Firm*—Wenderoth, Lind & Ponack

[57] ABSTRACT

This invention relates to a process for the production of hard vinyl chloride resin foams, which comprises mixing a vinyl chloride resin foam forming composition containing or not containing a foaming agent of organic decomposition type with at least one uniformly blended mixture comprising a vinyl chloride resin composition and a foaming agent of organic decomposition type in a larger amount than in the former composition and then subjecting the resulting mixture to foaming.

7 Claims, No Drawings

PROCESS FOR THE PRODUCTION OF HARD VINYL CHLORIDE FOAMS

BACKGROUND OF THE INVENTION

This invention relates to a process for the production of hard vinyl chloride resin foams and more particularly, it is concerned with a process for the production of cellular or foamed resin products having dense foams and uniform surface property with a high foaming efficiency or high expansion ratio.

Up to the present time, vinyl chloride resin foams have been prepared by various methods, for example (1) using volatile organic solvents, (2) using hydrocarbon compounds and (3) using foaming agents decomposition type. However, these methods of producing foams by using foaming agents have some unfavourable disadvantages. In the method (1) using volatile organic solvents, for example, a disadvantage is unavoidable that the working efficiency is lowered due to the inflammability of a volatile organic solvent and the necessity of removing and recovering the residual solvent in foams and it is difficult to store the resulting foams for a long time because of the volatile organic solvent used. The method (2) using hydrocarbon compounds has also a disadvantage that a special means or apparatus for introducing a hydrocarbon compound under pressure uniformly into a resin is required, the selection of a suitable hydrocarbon compound depends greatly upon a resin used and a long time storage property is inferior. Furthermore, the method (3) using foaming agents of decomposition type has also a disadvantage that foam controlling is difficult because the decomposition rate of a foaming agent, in particular, of inorganic decomposition type is stepwise slow. Lately foaming agents of organic decomposition type have been widely used, since they are relatively stable in inflammability and storage property and easy to handle due to the form of solid power, and furthermore, they can readily be mixed by a relatively simple mixing method and applied to various resins. The foaming agents of organic decomposition type have these many advantages, but, on the contrary, have some unfavorable disadvantages. That is to say, the quantity of the foaming agent must be within some limit, since if too little, no sufficient expansion ratio is obtained, whilst if too much, discoloration takes place due to the residual foaming agent and cells become large resulting in coarsening of the surface, in spite of that the expansion ratio is not increased so much. In order to overcome these disadvantages, it has been proposed to apply a radiation or bridging agent to a foaming agent-containing resin composition, thereby effecting the bridge making thereof (Japanese patent publication Nos. 19384/1973 and 4861/1973). According to this method, the expansion ratio is increased, but, on the contrary, several disadvantages are unavoidable that the bridged resin composition loses the intrinsic nature of thermoplastic resin, so that the workability is lowered and the molding or forming method is restricted, and sometimes encounters decomposition and coloration.

In the simplest method for the production of foams, in general, a resin and foaming agent are mixed and subjected to foaming in a suitable forming machine but, in this case, the cellular film strength must be sufficient enough to resist the gas pressure at the time when the foaming agent is decomposed. Therefore, the temperature at which a foaming agent is decomposed, gas quantity and gas pressure at the time when a foaming agent is decomposed, and melt viscosity of resin at the time when forming is carried out must be taken into consideration.

In the case of vinyl chloride resins, the elongation and viscosity of the molten resin are greatly changed in a forming machine, so satisfactory foams can hardly be obtained due to the uneven foamed structure and to the degassing phenomenon from the foam surface produced by breakage of the cell films. As a method to overcome these disadvantages there have been proposed various methods for modifying vinyl chloride resins by the use of plasticizers of modifiers miscible with vinyl chloride resins.

However the inventors have found that these plasticizers or vinyl chloride resin modifiers are effective for holding the cellular film but should be used in considerably large amounts so as to obtain a satisfactory cellular film strength. That is to say, it is found necessary to use a plasticizer in an amount of at least 10% by weight, preferably 20% by weight based on the weight of a vinyl chloride resin. The foams obtained by the method using plasticizers in such large amounts show a markedly lowered melting point, whereby the object of the present invention to obtain hard foams cannot be achieved. When using a vinyl chloride resin modifier, on the other hand, it is also found necessary to use in an amount of at least 10% by weight, preferably, at least 15% by weight based on the weight of a vinyl chloride resin. The use of a modifier which is expensive in such a large amount is disadvantageous from an economical point of view.

SUMMARY OF THE INVENTION

It is an object of the invention to provide a process for the production of hard vinyl chloride resin foams, whereby the above described disadvantages are overcome.

It is another object of the invention to provide a process for producing hard vinyl chloride resin foams using foaming agents of organic decomposition type with an increased foaming efficiency or expansion ratio and without losing the intrinsic workability of hard vinyl chloride resin.

It is a further object of the invention to provide a process for producing hard vinyl chloride resin foams having an excellent cellular film strength using a plasticizer and/or vinyl chloride resin modifier in a decreased amount.

These objects can be accomplished by a process for the production of hard vinyl chloride resin foams, which comprises mixing a vinyl chloride resin foam forming composition containing or not containing a foaming agent of organic decomposition type with at least one uniformly blended mixture of a vinyl chloride resin composition and foaming agent of organic decomposition type in a large amount than in the above described composition and then subjecting the resulting mixture to foaming.

DETAILED DESCRIPTION OF THE INVENTION

In accordance with the present invention, there is provided a novel process for the production of hard vinyl chloride resin foams having dense cells and uniform and good surface properties with a high foaming efficiency or expansion ratio, which comprises mixing a vinyl chloride resin foam forming composition containing a relatively small amount of foaming agent of organic decomposition type containing no foaming agent (which will hereinafter be referred to as "low foam composition" simply) with at least one uniformly blended mixture of a vinyl chloride resin composition, preferably, having an excellent cellular film strength, and a foaming agent of organic decomposition type in a larger amount than in the above described composition (which will hereinafter be referred to as "high foam composition" simply) and then subjecting the resulting mixture to foaming.

As discribed above, the feature of the invention consists in raising readily the expansion ratio of foams by the simple method comprising mixing the low foam composition with at least one of the high foam compositions. Even if the amount of a foaming agent of organic decomposition type is increased in one resin composition only, the expansion ratio is not raised, nor is obtained satisfactory foams because the foam surface is broken due to degassing and coloring takes place due to the residual foaming agent. This troublesome problem can be solved by the process of the invention.

Where a small amount of uniformly blended mixture comprising a vinyl chloride resin composition having a large cellular film strength and a foaming agent is added to vinyl chloride or vinyl chloride composition being free from a foaming agent and then subjected to foaming, hard vinyl chloride resin foams, in particular, with a low foamed structure can be produced. In this case also, hard vinyl chloride resin foams having a fine and uniform foamed structure can be obtained with a greatly reduced amount of plasticizer or modifier as compared with the prior art.

The low foam composition of the invention is a vinyl chloride resin foam forming composition comprising generally 100 parts by weight of vinyl chloride resin, 0.1 to 10 parts by weight of a stabilizer, at most 5 parts by weight, preferably, 0.1 to 1.0 part by weight of a foaming agent of organic decomposition type and, optionally, coloring agent, filler, lubricant, reinforcing agent, plasticizer, foaming agent decomposition temperature regulator and foam regulator.

The high foam composition of the invention is a uniformly blended mixture comprising an ordinary vinyl chloride resin composition, preferably, having an excellent cellular film strength and a foaming agent of organic decomposition type in a larger amount than that of the low foam composition. The resin composition having an excellent cellular film strength, that is, having a high foam holding capacity is a vinyl chloride resin composition containing at least one of ordinary plasticizers and vinyl chloride resin modifiers. Examples of the plasticizer used herein are those of phthalic acid ester type, phosphoric acid ester type, epoxy type and chlorine-containing type and examples of the vinyl chloride resin modifier used herein are MBS resin for blending (methyl methacrylate-butadiene-styrene copolymer), ABS resin for blending (acrylonitrile-butadiene-styrene copolymer), chlorinated polyethylene, acrylic acid type resin (e.g., Acryloid K-120 N (Trade Name) manufactured by Rhom & Haas Co.) and graft copolymer of ethylene-vinyl acetate copolymer and vinyl chloride polymer. This vinyl chloride resin composition having an excellent cellular film strength can also be used in the above described low foam composition.

The amount of a foaming agent of organic decomposition type added to the high foam composition is not particularly limited, but is larger than that of a foaming agent of organic decomposition type added to the foregoing low foam composition. Ordinarily a foaming agent of organic decomposition type is added in a proportion of 1.0 to 100 parts by weight, preferably 10 to 40 parts by weight to 100 parts by weight of vinyl chloride resin.

Preparation of the uniformly blended mixture comprising a vinyl chloride resin composition, preferably, having a large cellular film strength and a foaming agent is carried out by, for example, 1. blending or kneading the resin composition and foaming agent at a temperature of lower than the decomposition point of the foaming agent using an extruder or rolls, 2. blending the resin composition and foaming agent by means of, for example, a Henshel Mixer so that the resin melted partly or completely by the friction heat of the blades revolved at a high speed, or 3. blending the resin composition and foaming agent by means of a mixer of external heating type so that the resin is partly or completely melted and liquefied. Of course the blending method of the invention is not to be interpreted as being limited by these methods. As occasion demands, this high foam composition can further contain a stabilizer, lubricant, coloring agent, foam regulator, foaming agent decomposition temperature regulator, filler, etc.

The amount of the high foam composition mixed with the low foam composition depends on the amounts of foaming agents contained therein and expansion ratio desired and is not particularly limited. However, the high foam composition is generally added in a proportion of 1.0 to 30 parts by weight, preferably 3 to 10 parts by weight to 100 parts by weight of the low foam composition. Where the low foam composition contains no foaming agent, the high foam composition is preferably added thereto in the range of 1 to 10% by weight based on the weight of vinyl chloride resin.

The vinyl chloride resin used in this specification means not only vinyl chloride resin (homopolymer) but also copolymer resins of vinyl chloride monomer and other thermoplastic resin monomers, for example, vinyl chloride-vinyl acetate copolymer resin, vinyl chloride-ethylene-vinyl acetate copolymer resin, vinyl chloride-ethylene copolymer resin, vinyl chloride-propylene copolymer resin and other copolymers or graft copolymers of vinyl chloride and unsaturated compounds copolymerizable with vinyl chloride.

Examples of the foaming agent of organic decomposition type which can be used in the present invention are azo compounds such as azodicarbonamide, azoisobutyronitrile and azobisformamide, nitroso compounds such as N,N-dinitrosopentamethylenetetramine and sulfonyl hydrazide compounds such as p-toluenesulfonyl hydrazide and benzenesulfonyl hydrazide. These foaming agents can be used individually or in combination.

The following examples are given in order to illustrate the invention in detail without limiting the same.

EXAMPLE 1

Table 1

| Recipe of Low Foam Composition (L Composition) | | | |
|---|---|---|---|
| Composition | No. | L-1 L-2 L-3 (Parts by weight) | |
| PVC | | | |

Table 1-continued
Recipe of Low Foam Composition (L Composition)

| Composition | No. | L-1 | L-2 | L-3 |
|---|---|---|---|---|
| | | (Parts by weight) | | |
| Vinyl Chloride Resin (Denka Vinyl) SS-80 | | 100 | 100 | — |
| Resin | | | | |
| Vinyl Chloride-Propylene Copolymer (Vinychlon MR-P) | | — | — | 100 |
| Stabilizer | | | | |
| Tribasic Lead Sulfate | | 4.0 | 4.0 | 4.5 |
| Dibasic Lead Stearate | | 1.5 | 1.5 | 1.5 |
| Lead Stearate | | 0.5 | 0.5 | 0.5 |
| Calcium Stearate | | 0.5 | 0.5 | 0.5 |
| Foaming Agent | | | | |
| Azodicarbonamide (Unifoam AZ-H) | | 0.3 | 0.2 | 0.3 |
| 4,4'-Oxybisbenzenesulfonyl Hydrazide (Cellmic S) | | — | 0.2 | — |
| Modifier | | | | |
| ABS Resin For Blending (Blendex 431) | | 10 | — | — |
| Plasticizer | | | | |
| Dioctyl Phthalate (DOP) | | 5 | 10 | 5 |

The above described composition was stirred for 15 minutes by means of a ribbon blender to obtain a low foam composition.

Table 2
Recipe of High Foam Composition (H Composition)

| Composition | No. | H-1 | H-2 | H-3 |
|---|---|---|---|---|
| | | (Parts by Weight) | | |
| PVC Resin | | | | |
| Vinyl Chloride Resin (TS-1100) | | 100 | 100 | 100 |
| Stabilizer | | | | |
| Tribasic Lead Sulfate | | 4.5 | 4.5 | 4.5 |
| Dibasic Lead Stearate | | 2.0 | 2.0 | 2.0 |
| Lead Stearate | | 0.5 | 0.5 | 0.5 |
| Calcium Stearate | | 0.5 | 0.5 | 0.5 |
| Dibutyltin Maleate (T-501) | | 2.0 | 2.0 | 2.0 |
| Plasticizer | | | | |
| DOP | | 10.0 | 20.0 | 40.0 |
| Modifier | | | | |
| Chlorinated Polyethylene (Daisolac H-135) | | 15.0 | — | — |
| Acrylic Acid Type Resin (Acryloid K-120N) | | — | 20.0 | — |
| MBS Resin For Blending (Kaneace B12) | | — | — | 20.0 |
| ABS Resin For Blending (Blendex 201) | | — | — | 20.0 |
| Foaming Agent | | | | |
| Azodicarbonamide (Unifoam AZ-H) | | 20.0 | 20.0 | 15.0 |
| 4,4'-Oxybisbenzenesulfonyl Hydrazide (Cellmic S) | | — | 5.0 | — |
| Azodicarbonamide (Cellmic CAP) | | — | — | 10.0 |

The above described composition was blended by means of a Henshel Mixer at a temperature of up to 140° C to obtain a high foam composition.

These low foam compositions and high foam compositions were blended by means of a Henshel Mixer at room temperature and then subjected to an extrusion forming test under the following conditions:

| Extrusion Forming Condition | |
|---|---|
| i) Extruder | 40 mm Extruder manufactured by Ikegai Tekko Co. |
| ii) Screw | L/D = 22, C.R. = 3.5, 20 rpm |
| iii) Forming Temperature | Cylinder 1 (140° C), Cylinder 2 (170° C), Cylinder 3 (170° C), Adapter (150° C), Die (155° C) |
| iv) Die | Rod (Size of Formed Article 13 mmφ) |

Table 3

| | Test Results | | | | | |
|---|---|---|---|---|---|---|
| | No. 1 | 2 | 3 | 4 | 5 | 6 |
| H Composition | 3 (H-1) | 3 (H-2) | 5 (H-2) | 3 (H-3) | 2(H-1) + 2(H-2) | 5 (H-1)* |
| L Composition | 100(L-1) | 100(L-2) | 100(L-1) | 100(L-3) | 100(L-1) | 100 (L-1) |
| (by weight) | | | | | | |
| Density of Formed Article | 0.40 | 0.40 | 0.41 | 0.39 | 0.35 | 0.34 |
| Expansion Ratio** | 3.50 | 3.50 | 3.42 | 0.59 | 4.0 | 4.11 |
| Surface State of Foams*** | A | B | A | B | A | A |
| Colored State of Foams | No | No | No | No | No | No |

Note:
*High Foam Composition H-1 was blended at a temperature of lower than the decomposition point of the foaming agent in an extruder, followed by pulverizing in 30 meshes or less.
H-1 Blending Condition
i) Extruder 40 mmφExtruder
ii) Screw L/D = 22, C.R. = 2.5
iii) Forming Condition Cylinder 1 (100° C), Cylinder 2 (110° C), Cylinder 3 (120° C), Adapter (100° C), Die (110° C)
**Density of Material to be Foamed = 1.40
***A: Very Good, B: Good, C: Normal, D: Bad, E: Very Bad It is apparent from these results that, according to the invention, the expansion ratio is increased, the foam surface is held good and no coloring takes place due to the residual foaming agent.

Comparative Example 1

For comparison, the procedures of Example 1 were repeated except that the amount of the foaming agent was increased in the low foam composition of Example 1 or that only the high foam composition was subjected to the forming test. The recipes of these comparative compositions are shown in Table 4 and the properties of the resulting foams are shown in Table 5.

Table 4
Recipe of Comparative Composition

| No. | Composition | Foaming Agent | Amount of Foaming Agent (Parts by Weight per 100 Parts by Weight of PVC Resin) |
|---|---|---|---|
| 7 | L-1 | Azodicarbonamide | 0.3 |
| 8 | " | " | 0.7 |
| 9 | " | " | 3.0 |
| 10 | L-2 | 4,4'-Oxybisbenzene-sulfonyl Hydrazide | 0.6 |
| 11 | " | " | 1.0 |
| 12 | " | " | 3.0 |
| 13 | L-3 | Azodicarbonamide p-Toluenesulfonyl Hydrazide | 0.1 / 0.4 |
| 14 | " | Azodicarbonamide p-Toluenesulfonyl Hydrazide | 0.1 / 1.0 |
| 15 | " | Azodicarbonamide p-Toluenesulfonyl Hydrazide | 0.5 / 1.5 |
| 16 | H-1 | — | — |
| 17 | H-2 | — | — |
| 18 | H-3 | — | — |

Table 5
Properties of Foams

| No. | Density of Formed Article | Expansion Ratio* | Surface State of Foams | Colored state of Foams |
|---|---|---|---|---|
| 7 | 0.80 | 1.75 | B | No |
| 8 | 0.72 | 1.95 | C | No |
| 9 | 0.98 | 1.43 | E | Light Yellow |
| 10 | 0.78 | 1.80 | B | No |
| 11 | 0.80 | 1.75 | B | No |
| 12 | 0.92 | 1.54 | D | No |
| 13 | 0.70 | 2.0 | B | No |
| 14 | 0.75 | 1.87 | D | No |
| 15 | 0.85 | 1.65 | E | Light Yellow |
| 16 | 0.96 | 1.46 | E | " |
| 17 | 1.02 | 1.37 | D | " |
| 18 | 0.98 | 1.43 | D | " |

Note: *Density of Material to be foamed = 1.40

It is apparent from the results for comparison that, when the amount of a foaming agent is increased in only one resin composition, the expansion ratio is not so increased and rather the foam surface becomes rough or the foams is colored by the residual foaming agent not decomposed.

Example 2 and Comparative Example 2

High foam compositions H Table 6 were mixed with vinyl chloride resin compositions according to the basic recipe of Table 7, and then subjected to forming according to the extrusion forming conditions of Table 8, thus obtaining hard vinyl chloride resin foams having the properties as shown in Table 10. The high foam compositions H, plasticizers, modifiers and foaming agents in Table 7 were changed according to Table 9.

Table 6
Recipe of High Foam Composition (H Composition)

| Composition No. | H-1 | H-2 | H-3 |
|---|---|---|---|
| | (Parts by Weight) | | |
| PVC Resin | | | |
| Vinyl Chloride Resin (TS-1100) | 100 | 100 | 100 |
| Stabilizer | | | |
| Dibutyltin Maleate (T-501) | 5 | 5 | 5 |
| Plasticizer | | | |
| DOP | 10 | 10 | 30 |
| Modifier | | | |
| Chlorinated Polyethylene (Daisolac H-135) | 15 | — | — |
| ABS Resin For Blending (Blendex 201) | — | — | 20 |
| MBG Resin For Blending (Kaneace B12) | — | — | 5 |
| Ethylene/Vinyl Acetate/Vinyl Chloride Graft Copolymer (Geon Graftmer 1261 R-5) | — | 20 | — |
| Foaming Agent | | | |
| Azodicarbonamide (Unifoam AZ-H) | 20 | 15 | 20 |
| Azodicarbonamide (Cellmic CAP) | — | — | 5 |
| 4,4'-Oxybisbenzenesulfonyl Hydrazide (Cellmic S) | — | 5 | — |

Table 7
Basic Recipe for Producing Foams

| | Present Invention | Control |
|---|---|---|
| | (Parts by Weight) | |
| Vinyl Chloride Resin (Denka Vinyl SS-80) | 100 | 100 |
| Stabilizer | | |
| Tribasic Lead Sulfate | 4 | 4 |
| Dibasic Lead Stearate | 0.5 | 0.5 |
| Calcium Stearate | 0.5 | 0.5 |
| Lead Stearate | 0.5 | 0.5 |
| H Composition | Changed | — |
| Plasticizer and Modifier | — | Changed |
| Foaming Agent | — | Changed |

Table 8
Extrusion Forming Condition

| | |
|---|---|
| Extruder | 40 mm Extruder made by Ikegai Tekko Co. |
| L/D | 22 |
| Screw C.R. | 3.5 |
| Forming Temperature (° C) | |
| Cylinder 1 | 145 |
| Cylinder 2 | 180 |
| Cylinder 3 | 180 |
| Adapter | 165 |
| Die | 165–190 |
| Shape of Formed Article | 15 × mm Square Bar |

Table 9
Recipe for Producing Foams

| No. | H Composition (Parts by Weight) | Foaming Agent (Parts by Weight) | Plasticizer or Modifier (Parts by Weight) | Total Foaming Agent in Foams (%) | Total Plasticizer & Modifier in Foams(%) |
|---|---|---|---|---|---|
| 19 | 3 | — | — | 0.004 | 0.005 |
| 20 | 5 | — | — | 0.005 | 0.007 |
| 21 | 3 | — | — | 0.006 | 0.009 |
| 22 | — | Azodicarbonamide[1] 0.4 | DOP 1 | 0.004 | 0.009 |
| 23 | — | Azodicarbonamide[1] 0.4 | DOP 3 | 0.004 | 0.027 |
| 24 | — | Azodicarbonamide[1] 0.4 | DOP 10 | 0.004 | 0.086 |
| 25 | — | Azodicarbonamide[1] 0.4 | DOP 20 | 0.003 | 0.159 |
| 26 | — | Azodicarbonamide[1] 0.35 Azodicarbonamide[2] 0.1 | ABS Resin For Blending[3] 3 | 0.004 | 0.028 |

Table 9-continued

| | Recipe for Producing Foams | | | |
|---|---|---|---|---|
| No. | H Composition (Parts by Weight) | Foaming Agent (Parts by Weight) | Plasticizer or Modifier (Parts by Weight) | Total Foaming Agent in Foams (%) | Total Plasticizer & Modifier in Foams(%) |
| 27 | — | Azodicarbonamide[1] 0.35  Azodicarbonamide[2] 0.1 | ABS Resin For Blending[3] 10 | 0.004 | 0.086 |
| 28 | — | Azodicarbonamide[1] 0.35  4,4'-Oxybenzene-siulfonyl Hydrazide[4] 0.1 | Chlorinated Polyethylene[5] 5 | 0.004 | 0.045 |
| 29 | — | Azodicarbonamide[1] 0.35  4,4'-Oxybenzene-sulfonyl Hydrazide[4] 0.1 | DOP 10 Chlorinated Polyethylene[5] 5 | 0.004 | 0.124 |
| 30 | — | Azodicarbonamide[1] 0.35  Azodicarbonamide[2] 0.1 | DOP 3 ABS Resin For Blending[3] 3 | 0.004 | 0.054 |
| 31 | — | Azodicarbonamide[1] 0.35  Azodicarbonamide[2] 0.1 | DOP 10 ABS Resin For Blending[3] 10 | 0.004 | 0.124 |

Note: [1]Azodicarbonamide
Unifoam AZ, Trade Mark, Made by Otsuka Kagaku Co.
[2]Azodicarbonamide
Cellmic CAP, Trade Mark, Made by Sankyo Kasei Co.
[3]ABS Resin For Blending
Blendex 201, Trade Mark, Made by Ube Cicon Co.
[4]4,4'-Oxybenzenesulfonyl Hydrazide
Cellmic S, Trade Mark, Made by Sankyo Kasei Co.
[5]Chlorinated Polyethylene
Daisolac H-135, Trade Mark, Made by Osada Soda Co.
Test Nos. 19-21: Present Invention
            22-31: Control Table 10

| | Properties of Foams | | |
|---|---|---|---|
| No. | Density of Foams | Thermal Deformation Temperature (° C) | Surface State of Foams |
| 19 | 0.70 | 56 | B |
| 20 | 0.82 | 58 | C |
| 21 | 0.72 | 56 | B |
| 22 | 0.98 | — | D |
| 23 | 0.90 | — | D |
| 24 | 0.82 | 40 | C |
| 25 | 0.85 | 27 | B |
| 26 | 0.92 | — | D |
| 27 | 0.72 | 58 | B |
| 28 | 0.85 | — | D |
| 29 | 0.76 | 36 | B |
| 30 | 0.88 | — | D |
| 31 | 0.72 | 38 | B |

When foams were prepared under the same conditions as described above except using vinyl chloride-propylene copolymer (Vinychlon MR-P 8000, Trade Mark, made by Mitsui Toatsu Co.) instead of the vinyl chloride resin (Denka Vinyl SS-80, Trade Mark, made by Denki Kagaku Co.) in Table 7 and their properties were examined, the similar results were obtained.

As is evident from the above described results, excellent foams can be obtained without lowering the thermal deformation temperature according to the process of the invention using a plasticizer and modifier in amounts of about 1/10 or less times those used in the prior art. On the contrary, the Comparative Examples, and plasticizer and modifier should be added in amounts of 10 or more times as much as those in the process of the invention in order to obtain the similar foams comparable to those of the invention. This is disadvantageous from an economical point of view. When a large amount of plasticizer is used, the thermal deformation temperature is markedly lowered.

What is claimed is:

1. A process for the production of hard vinyl chloride resin foams, which comprises mixing a vinyl chloride resin foam forming composition comprising 100 parts by weight of vinyl chloride resin, 0.1 to 10 parts by weight of a stabilizer and 0.1 to 1.0 by weight of a foaming agent of organic decomposition type with at least one uniformly blended mixture comprising 100 parts by weight of vinyl chloride resin and 10 to 100 parts by weight of a foaming agent of organic decomposition type in a proportion of 1 to 30 parts by weight of the latter composition to 100 parts by weight of the former composition and then subjecting the resulting mixture to foaming.

2. The process of claim 1, wherein the vinyl chloride resin is selected from the group consisting of polyvinyl chloride and copolymers of vinyl chloride-vinyl acetate, vinyl chloride-ethylene-vinyl acetate, vinyl chloride-ethylene and vinyl chloride-propylene.

3. The process of claim 1, wherein the foaming agent of organic decomposition type is at least one member selected from the group consisting azodicarbonamide, azoisobutyronitrile, azobisformamide, N,N-dinitrosopentamethylenetetramine, p-toluenesulfonyl hydrazide and benzenesulfonyl hydrazide.

4. The process of claim 1, wherein the uniformly blended mixture contains a vinyl chloride resin composition having an excellent cellular film strength.

5. The process of claim 4, wherein the vinyl chloride resin composition contains at least one of ordinary plasticizers and vinyl chloride resin modifiers.

6. The process of claim 5, wherein the vinyl chloride resin modifier is selected from the group consisting of methyl methacrylate-butadiene-styrene copolymer, acrylonitrile-butadiene-styrene copolymer, chlorinated polyethylene, acrylic acid resin and graft copolymer of ethylene-vinyl acetate copolymer and vinyl chloride polymer.

7. The process of claim 1 wherein the uniformly blended mixture is prepared by blending the components with heating and melting at a temperature of less than the decomposition temperature of the foaming agent.

* * * * *